United States Patent [19]

Harnett

[11] 3,771,653
[45] Nov. 13, 1973

[54] COMPOST FOR REMOVING OIL FILMS FROM WATER

[75] Inventor: John P. Harnett, Chicago, Ill.

[73] Assignee: International Minerals & Chemical Corporation, Libertyville, Ill.

[22] Filed: Nov. 17, 1970

[21] Appl. No.: 90,459

[52] U.S. Cl. .......................... 210/40, 210/DIG. 21
[51] Int. Cl. .............................................. C02b 9/02
[58] Field of Search ................... 71/13, 14; 210/40, 210/DIG. 21, 36

[56] References Cited
UNITED STATES PATENTS

| | | | |
|---|---|---|---|
| 3,464,920 | 9/1969 | Pirson et al. | 210/40 X |
| 3,385,687 | 5/1968 | Brown | 71/13 |
| 3,520,806 | 7/1970 | Haigh | 210/40 |
| 3,536,615 | 10/1970 | Bunn | 210/40 X |

Primary Examiner—Samih N. Zaharna
Assistant Examiner—Thomas G. Wyse
Attorney—James E. Wolber and Peter Andress

[57] ABSTRACT

An oil film is removed from the surface of water by contacting the same with compost prepared by the bacterial digestion of organic waste material.

8 Claims, No Drawings

3,771,653

COMPOST FOR REMOVING OIL FILMS FROM WATER

BACKGROUND OF THE INVENTION

This invention relates to a method for absorbing hydrocarbons and, more particularly, to a method for removing oil in a film from the surface of water.

There has long been a need for an effective method of removing oil films from the surface of bodies of water such as rivers, lakes and oceans. These films, which occur as a result of the accidental or intentional discharge of oil into the water, are highly undesirable for a number of reasons. The oil floating on the water is damaging to marine life since it reduces the quantity of oxygen available for the marine life by retarding the reoxygenation of the water. In addition, the oil washes onto shores where it is deposited so as to cause irreparable damage to shorelines and beaches, as well as harm to waterfowl frequenting such shorelines. The oil accumulates on wooden piers and the like to also present serious fire hazards.

Two relatively recent accidental occurrences have emphasized the need for an effective method of removing liquid hydrocarbons, i.e., oils and greases, on the surface of water in a film. The oil tanker Torrey Canyon struck a reef off the English coast in 1967 and split to spill its cargo of oil into the Atlantic Ocean. A considerable quantity of the oil was carried to the coastline of England and deposited on the English shore so as to adversely affect the area, although great efforts and expense were expended to avoid this. More recently, a leak in an off-shore well being drilled in the Santa Barbara Channel damaged a portion of the coastline of California and harmed wildlife. However, there would be a need for an effective method for removing oil films from water, even in the absence of such accidental spillages, in view of apathy toward water pollution. For example, oil tankers carry ballast water in their compartments when they are empty enroute to pick up a new cargo of oil. The ballast water containing an oily residue is discharged into the sea to empty the compartments of the tankers for a shipment of oil. It is estimated that this practice from commercial tankers in the vicinity of terminal facilities in Cook Inlet of Alaska coated 1,000 miles of shoreline of Alaska's Kodiak Island chain with oil and destroyed 10,000 waterfowl. As indicative of the magnitude of the problem, the Coast Guard estimated that at least 347,000 barrels of oil were spilled in U.S. territorial waters in 1969.

A variety of different methods has been suggested and/or used for removing oil spills from water. Dispersants and detergents have been used to break up the oil film, but this method has not been too successful. In addition, it has been contended that this method is not entirely satisfactory from an ecological standpoint since some of the chemicals are far more deadly and damaging to marine life than the oil itself. The chemicals also cause penetration of the oil considerably further into sand on beaches than if they weren't used, thus complicating the clean-up problem. Many absorbent materials have also been proposed for removing oil spills from water. These materials include organic and inorganic materials such as sawdust, vermiculite, diatomaceous earth, peat fibers, cork flour, and the like. It has also been suggested to use plastics such as porous polystyrene, urethane and polyethylene. However, none of the aforementioned absorbents are entirely satisfactory for use in treating oil spills. For example, many of the absorbents have to be disposed of or burned after they have absorbed oil since it is impractical to recover the oil from them. Many of them, such as diatomaceous earth and vermiculite, are effective in absorbing only relatively small amounts of oil since they sink to the bottom of the water before significant quantities of oil are absorbed. The plastic absorbents generally are too expensive and do not absorb sufficient oil to be economically practical. Furthermore, absorbed oil can only be difficultly removed from polystyrene by heating the same so that it melts and forms a liquid layer that separates from the oil. Different types of equipment have also been proposed for use in removing oil from water.

SUMMARY OF THE INVENTION

This invention is based on the discovery of an improved method for removing oil from water. In accordance with this invention, an oil film is removed from the surface of water by contacting the same with a compost prepared by the aerobic digestion of organic waste material. The compost with the absorbed oil floats on the water and can be easily collected to recover the oil. The oil is then separated from the compost, which may then again be used for recovering more oil. Alternatively, the compost is weighted to such a degree that it will sink to the bottom of the water after absorbing oil from the layer of oil on top of the water.

It is, therefore, an object of this invention to provide a method for absorbing hydrocarbon liquids.

Another object of this invention is to provide a method for removing oil from water.

Another object of this invention is to provide a method for separating oil which is present in a film on top of water.

Still another object of this invention is to provide a method for contacting oil on top of water with compost.

A further object of this invention is to provide a method for selectively absorbing oily layers floating upon bodies of water.

A still further object of this invention is to provide a method utilizing compost for removing oil spills from water.

These and further objects of this invention will become apparent or be described as the description thereof herein proceeds.

DESCRIPTION OF THE PREFERRED EMBODIMENTS

The compost which is used in accordance with the instant invention as an absorbent for recovering the oil is prepared by the aerobic digestion of organic putrescible material. The compost is prepared from the organic waste material by techniques well-known in the art utilizing bacteria. Composting plants utilizing such processes for converting refuse into compost are located in Altoona, Pennsylvania; Houston, Texas; St. Petersburg, Florida and Mobile, Alabama.

Typical of such composting processes is that used in the plant operated in Houston, Texas by the Lone Star Organics, Inc. division of Metropolitan Waste Conversion Corporation. In this process the municipal refuse delivered to the plant is initially sorted, and salvageable cardboard, paper, rags, glass and non-ferrous metals are removed. Large pieces of iron and steel are also removed since they can damage the grinding mills that are subsequently used for processing the refuse. The salvage material is baled and shipped. Inert non-decompostables and non-combustibles such as rubber, heavy plastics, ceramics, and the like are selectively removed for clean land fill.

The material remaining after the salvage material is removed is comminuted, i.e., in hammer mills, into uniformly small-sized material which permits quick, controlled decomposition of organic wastes. Ferrous materials, e.g., tin cans, are mechanically removed after the grinding operation. The comminuted refuse is then conveyed into a digestion tank or bay where it usually remains for 4 to 6 days, and air is injected into the digesting mass to provide optimum oxygen and temperature control. The comminuted refuse may be initially mixed with de-watered sewage sludge to enrich the same with compostable organic matter. A temperature of about 135° F. is maintained in the digestion tanks during the first 24 hours. This is raised to in excess of 145° F. at the end of 48 hours and a final range of between about 165° to 170° F. The material leaving the digestion tank is a dark brown tobacco-like textured compost, which is conveyed to a finishing area for final grinding, screening and drying.

The process utilized in the Houston plant of Lone Star Organics, Inc. for producing compost from refuse is described in further detail on pages 18 and 19 of the Spring, 1968 issue of Compost Science, published by Rodale Press Inc. of Emmaus, Pennsylvania, the brochure entitled, "A Modern Municipal Waste Disposal Process," distributed by Metropolitan Waste Conversion Corporation, and U.S. Pat. Nos. 3,385,687 and 3,533,775. All of these publications are herein incorporated by reference for a more detailed description of a useful process of the art.

The compost materials employed herein are oleophilic and hydrophobic, so that they will preferentially absorb oil from water. The oils which are absorbed in the process of this invention include all oils which are immiscible in water, whether they are of mineral, vegetable or animal origin. Mineral oils that are lighter than water, such as crude oil, gasoline, fuel oil and lubricating oils, are the most common oily contaminants of water and, therefore, the most likely to be recovered in accordance with this invention.

Compost produced from organic waste material by bacterial digestion utilizing processes such as employed in the Houston plant of Lone Star Organics, Inc. are in many respects superior as an oil absorbent to other materials that have been proposed or used for removing oil from water. The absorbent utilized in the process of this invention is relatively inexpensive since it is a product of a process for alleviating the refuse disposal problems of municipalities. Another decided advantage of the compost is that it can be readily compressed to relatively high density for shipment and storage without destroying any of its absorptive characteristics. The compost may then be easily dispersed on the water for use, or it may even be utilized in compressed form, as hereinafter described in greater detail. Because of its hydrophobic and oleophilic characteristics and the low bulk density (6 pounds per cubic foot) the compost floats on water and absorbs oil so that compost containing the absorbed oil can be easily scooped up for recovering the oil. Unless the compost is weighted as hereinafter described, these materials possess the advantage that they will even float when oil has been absorbed to the maximum degree. The compost is equally effective for absorbing oil from both sea water and fresh water.

The oil-containing compost can be readily removed from the surface of the water by any suitable means such as scooping from the surface through a wire screen. The water will drain from the compost and pass through the screen while the oil-containing compost is retained by the screen. The mesh of a wire screen used for removing the compost from water will necessarily depend on the form in which the compost is used. Specifically, a finer mesh screen is necessary where the compost is dispersed on the surface of the water than when it is used in a compressed and baled form.

The absorbed oil may be recovered from the compost by any suitable method, such as compressing the oil-containing compost to squeeze substantially all of the oil from the compost, which may then be used again for absorbing oil. If desired, the compost containing residual oil that is not removed by the compressing may be briquetted for use as a fuel. The absorbed oil may be recovered from the compost by a number of other methods, including centrifugation and the use of wringer-type devices.

The lighter-than-water compost may be weighted to such a degree that it becomes heavier than water as it absorbs oil. The weighting of the compost may be accomplished by a number of ways, such as contacting it with a relatively fine granular material, e.g., sand, and a material effective for binding the sand to the compost even in water, e.g., crude oil. For example, one part of compost mixed with two parts of sand wetted with 1% crude oil will initially float on water and absorb oil until it becomes heavier than water and sinks. The quantity of sand or other weighting material used should be somewhat greater than that marginally needed to weight the compost so that it is heavier than water at almost maximum oil absorption since, as the oil begins to decompose, a liberated gas that lends the oil-containing compost bouyancy forms and sticks to the surface of the sunken mass. The oil-containing compost is either embedded on the bottom of a quiescent body of water or carried away by the undercurrent. The weighted compost may be inoculated with oil-decomposing bacteria to hasten the decomposition of the oil in the water.

The compost used as an absorbent in accordance with this invention may be contacted with the oil by any suitable means. The contact may be effected by dispersing a layer of shredded compost upon the surface of the water in the area of an oil leak, preferably agitating the water by boats to provide turbulence that achieves contact between the oil film and the compost. The compost containing absorbed oil is then gathered by using a wire net or other suitable means to gather the same. The compost may also be used in a compacted form for controlling and collecting oil spills. In this method a plurality of linked masses of compost, each of which is preferably held together by netting or wire gauze, are employed to encircle an oil spill and contain the same within a definite area. The oil may then be recovered by dispersing loose fibers of the compost within the confined area to absorb the oil.

Still another method of employing the compost is to pass the oily water through a filter or bed of the compost so that it absorbs the oil from the water before it is discharged. This method is especially useful for removing oil from the ballast of oil tankers before it is discharged into the ocean. An alternate approach to ballast clean-up would be to charge compost to the compartment containing the oily ballast in an amount sufficient to absorb the oil. This is preferably done at the time the ship takes on the ballast water. The movement of the ship during the return voyage will affect contact between the compost and the oil residue in the ballast water, and the compost will thus absorb the oil. The ballast is then removed in the usual manner by pumping, but a screen is used to catch the oil-laden compost. The screen may be advantageously located on the inlet pipe to the ballast pump, and the compost is left in the compartment to be mixed with the new cargo of oil. The compost would represent only a negligible impurity (typically about 0.01 to 0.02% by weight) in the new oil cargo.

The following non-limiting example will serve to further illustrate the method of this invention.

EXAMPLE

A quantity of 33 degree API crude oil was added to water to form a film thereon. Compost obtained under the tradename of ALIVE from the Houston plant of Lone Star Organics, Inc. was added to the water while it was being agitated to simulate wave action. The compost completely absorbed the oil, picking up about five times its weight in oil. The compost containing the absorbed oil was removed from the oil and finally squeezed at 1,000 p.s.i. to effect a 90% recovery of the absorbed oil. A briquette which may be used as fuel remained after the oil was removed by the compression.

Although this invention has been described in relation to specific embodiments, modifications may be made by one skilled in the art without departing from the intended scope of the invention as defined by the appended claims.

I claim:

1. A method of removing oil from water which comprises contacting the oil with compost.

2. The method in accordance with claim 1 wherein the compost is prepared from organic material by aerobic digestion.

3. The method in accordance with claim 2 wherein compost is added to ballast water in a compartment in an oil tanker which also contains a mineral oil, whereby said compost absorbs said mineral oil, and the contents of said compartment are pumped through a screen to discharge said water and leave said compost with absorbed oil in said compartment.

4. The method in accordance with claim 2 wherein the oil is present as a film on the surface of the water.

5. The method in accordance with claim 4 wherein compost containing absorbed oil is removed from the surface of the water, and absorbed oil is recovered from the compost.

6. The method in accordance with claim 2 wherein the oil is a hydrocarbon liquid.

7. The method in accordance with claim 6 wherein the oil is mineral oil.

8. The method in accordance with claim 7 wherein the water is sea water.

* * * * *